(12) United States Patent
Moran et al.

(10) Patent No.: US 6,308,822 B1
(45) Date of Patent: Oct. 30, 2001

(54) CONVEYING APPARATUSES, INDICATION ASSEMBLIES, METHODS OF INDICATING OPERATION OF A CONVEYING APPARATUS, AND METHODS OF OPERATING A CONVEYING APPARATUS

(75) Inventors: Thomas P. Moran, Walla Walla; Anne-Marie Bauman; Mark Allison Bauman, both of College Place, all of WA (US)

(73) Assignee: Key Technology, Inc., Walla Walla, WA (US)

(*) Notice: Subject to any disclaimer, the term of this patent is extended or adjusted under 35 U.S.C. 154(b) by 0 days.

(21) Appl. No.: 09/360,333

(22) Filed: Jul. 22, 1999

(51) Int. Cl.[7] ............................................. B65G 27/32
(52) U.S. Cl. ........................................................ 198/762
(58) Field of Search ................................... 198/761, 762

(56) References Cited

U.S. PATENT DOCUMENTS

| | | |
|---|---|---|
| 2,876,891 | 3/1959 | Long et al. . |
| 2,951,581 | 9/1960 | Long et al. . |
| 3,128,911 * | 4/1964 | Morris et al. ..................... 198/762 X |
| 3,380,572 | 4/1968 | Luger . |
| 4,168,774 * | 9/1979 | Musschoot ....................... 198/762 X |
| 4,313,535 | 2/1982 | Carmichael . |
| 4,811,835 * | 3/1989 | Bullivant et al. .................... 198/762 |
| 5,054,606 | 10/1991 | Musschoot . |
| 5,080,218 * | 1/1992 | Izume et al. ...................... 198/762 X |
| 5,688,103 | 11/1997 | Tsuji et al. . |
| 5,883,478 * | 3/1999 | Thesling .......................... 198/762 X |
| 5,944,170 * | 8/1999 | LaVeine et al. ...................... 198/762 |

FOREIGN PATENT DOCUMENTS

| | | | |
|---|---|---|---|
| 2935739 * | 3/1981 | (DE) .................................... 198/762 |
| 2-132011 * | 5/1990 | (JP) ..................................... 198/762 |
| 1093650 * | 5/1984 | (SU) .................................... 198/762 |

* cited by examiner

Primary Examiner—James R. Bidwell
(74) Attorney, Agent, or Firm—Wells, St. John, Roberts, Gregory & Matkin, P.S.

(57) ABSTRACT

Conveying apparatuses, indication assemblies, methods of indicating operation of a conveying apparatus, and methods of operating a conveying apparatus are provided. According to one aspect, a conveying apparatus includes a frame; a bed configured to convey material in a direction; a drive device configured to impart movement to the bed; and an indication assembly configured to indicate operation of the conveying apparatus in an operational state. Another aspect provides a method of indicating operation of a conveying apparatus comprising: providing a conveying apparatus including a bed; supporting the bed using a frame; imparting movement to the bed to induce movement of material within the bed; and indicating operation of the conveying apparatus in an operational state.

39 Claims, 10 Drawing Sheets

CONVEYING APPARATUSES, INDICATION ASSEMBLIES, METHODS OF INDICATING OPERATION OF A CONVEYING APPARATUS, AND METHODS OF OPERATING A CONVEYING APPARATUS

TECHNICAL FIELD

This invention relates to conveying apparatuses, indication assemblies, methods of indicating operation of a conveying apparatus, and methods of operating a conveying apparatus.

BACKGROUND OF THE INVENTION

Vibratory conveying systems are known in the art. A vibratory drive is connected directly to the conveying frame or bed in most conventional vibratory conveying systems. Some experimentation has been conducted wherein the vibratory device is connected to a support frame and the support frame is excited or primarily vibrated with the vibration being transferred through springs indirectly to the conveying member or bed. Exemplary conventional systems are described in U.S. Pat. Nos. 2,876,891, 2,951,581 and 3,380,572.

Newer designs have provided a system wherein the vibration amplitude of the excited frame is reduced while the conveyor bed or member is vibrated at its natural frequency of maximum amplitude. The principal variables are the rpm of the vibratory drive member, the spring constant of the support springs supporting the conveyor bed on the excited frame, the weight of the conveyor bed, the weight of the product or load being conveyed and the weight of the excited frame.

The generally recognized advantages of such systems over conventional direct vibratory conveyors are that it is possible under some conditions to transfer less vibration into the floor or ceiling supports and to provide a conveyor that is considerably less massive than direct drive vibrating systems.

U.S. Pat. No. 4,313,535 teaches an improved excited frame, vibratory conveying apparatus for moving particulate material. Plural supports or springs space a conveyor member from the excited frame. The device of the '535 patent teaches a vibratory drive means mounted to an elongated conveying frame for vibrating the elongated conveying frame in an intended direction for conveying particulate material.

The drive means produces a vibratory motion along a linear line of force. The device of the '535 patent provides a configuration for operation over a large range of loads without any appreciable vibration of the excited frame.

Such systems are preferably configured for use with various types of particulate material. For example, one conveying apparatus can be configured to convey one type of material in one application and another similar conveying apparatus can be configured to convey another material in another application.

Vibratory conveying apparatuses are preferably tuned for a particular application. In some applications, vibratory conveying apparatuses have been observed to go out of tune over a period of time of use. For example, a vibratory conveying apparatus can go out of tune if too much particulate material is provided upon the bed.

Operating the vibratory conveying apparatuses in an out-of-tune state can have detrimental effects upon the apparatuses themselves. For example, such operation can lead to premature failure of the springs provided intermediate the bed and the frame.

Thus, there exists a need to provide improved conveying apparatuses and methodologies which overcome the problems associated with the prior art.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

According to one aspect of the present invention, a conveying apparatus comprises: a frame; a bed configured to convey material in a direction; a drive device configured to impart movement to the bed; and an indication assembly configured to indicate operation of the conveying apparatus in an operational state.

According to a second aspect, a conveying apparatus comprises: a frame; a bed configured to convey material in a direction; a drive device configured to impart movement to the bed and the frame; and an indication assembly configured to determine a phase angle relationship of the movement of the bed and the movement of the frame and to indicate operation of the conveying apparatus in an operational state responsive to the phase angle relationship being within a range.

According to another aspect, a indication assembly configured to indicate operation of a conveying apparatus comprises: a bed sensor coupled with the bed to monitor movement of the bed and output a signal indicative of the movement of the bed; a frame sensor coupled with the frame to monitor movement of the frame and output a signal indicative of the movement of the frame; an indicator configured to indicate operation of the conveying apparatus in an operational state; and a controller configured to determine a phase angle relationship of the movement of the bed and the movement of the frame responsive to processing of the signal from the bed sensor and the signal from the frame sensor and to control the indicator to indicate operation responsive to the phase angle relationship being within a range.

According to another aspect, a conveying apparatus comprises: a frame; a bed configured to convey material in a direction; a drive device configured to impart movement to the bed; a control assembly configured to determine an operational state of the conveying apparatus; and memory configured to store the operational state.

Another aspect provides a vibratory conveying apparatus for moving material comprising: a frame; a bed configured to convey material in an intended direction; a plurality of supports coupled with the frame and the bed and configured to enable the bed to reciprocate in the intended direction; a drive device operable to impart vibratory movement to the bed and the frame; and an indication assembly including: a bed sensor coupled with the bed to monitor movement of the bed and output a signal indicative of the movement of the bed; a frame sensor coupled with the frame to monitor movement of the frame and output a signal indicative of the movement of the frame; an indicator configured to indicate operation of the conveying apparatus in an operational state; and a controller configured to determine a phase angle relationship of the movement of the bed and the movement of the frame responsive to processing of the signal from the bed sensor and the signal from the frame sensor, and to control the indicator to indicate operation responsive to the phase angle relationship being within a range.

Another aspect provides a method of indicating operation of a conveying apparatus comprising: providing a conveying apparatus including a bed; supporting the bed using a frame; imparting movement to the bed to induce movement of material within the bed; and indicating operation of the conveying apparatus in an operational state.

Another aspect includes a method of indicating operation of a conveying apparatus comprising: providing a conveying apparatus including a bed; supporting the bed using a frame; imparting movement to the bed to induce movement of material within the bed; imparting movement to the frame; determining a phase angle relationship of the movement of the bed and the movement of the frame; and indicating operation of the conveying apparatus in an operational state responsive to the phase angle relationship being within a range.

According to another aspect, a method of determining a phase angle relationship of movement of a frame and movement of a bed of a conveying apparatus comprises: providing plural signals indicative of respective movements of a frame and a bed; sampling the signals to provide respective waveforms; calculating centerlines for the respective waveforms; and determining at least one delta phase angle value from corresponding intersections of the waveforms with the respective centerlines.

Another aspect provides a method of operating a conveying apparatus comprising: providing a conveying apparatus including a bed; supporting the bed using a frame; imparting movement to the bed to induce movement of material within the bed; determining an operational state of the conveying apparatus; and storing the operational state.

Figure 1:
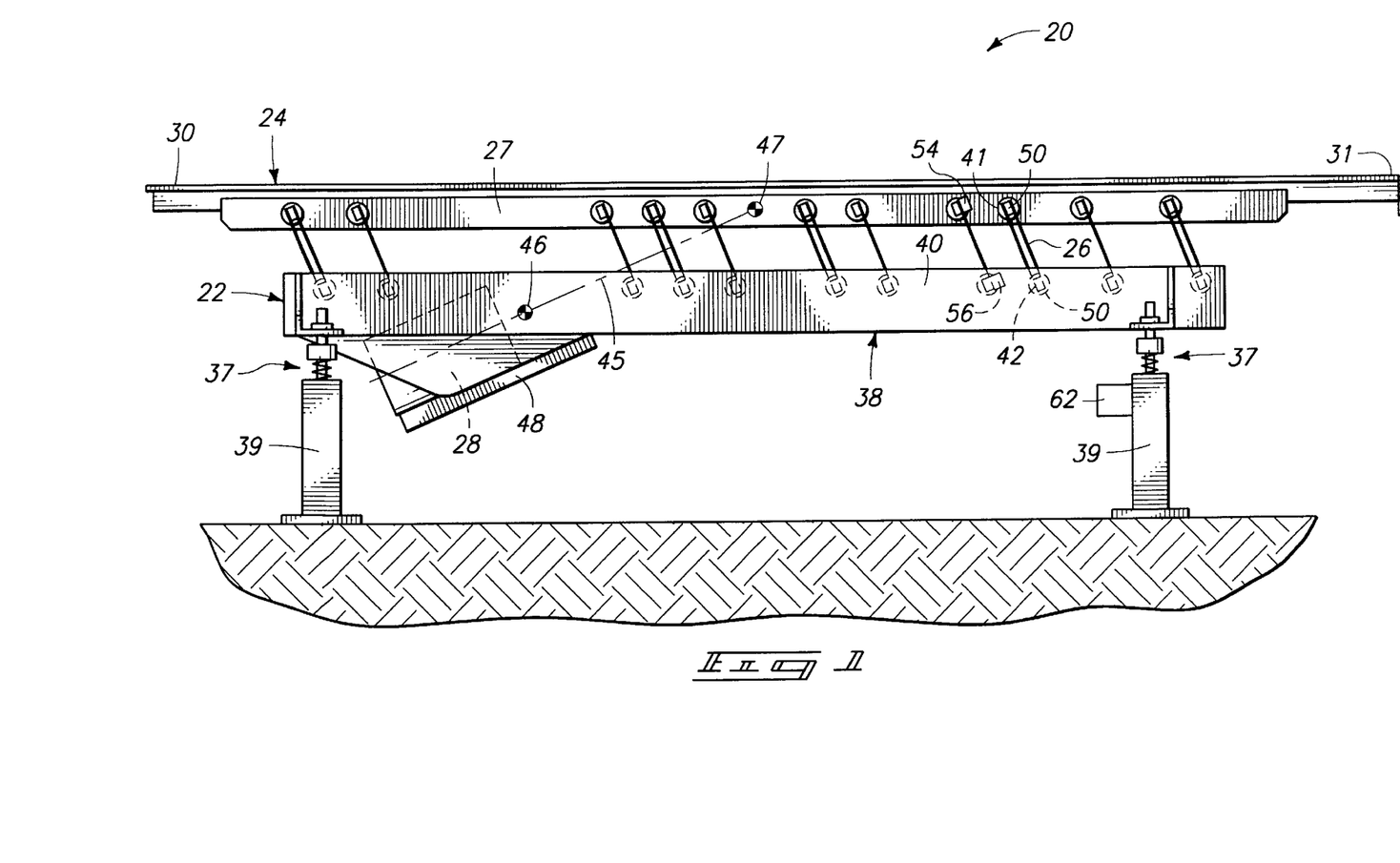
FIG. 1 is a side elevational view of one configuration of a conveying apparatus.

Referring to FIG. 1, a conveying apparatus generally designated with the numeral 20 is illustrated. The depicted embodiment of the conveying apparatus 20 comprises a vibratory conveying apparatus for moving particulate material. The present invention discloses improvements of the apparatuses and conveying methods disclosed in U.S. Pat. No. 4,313,535, which is incorporated by reference herein.

Although the depicted conveying apparatus 20 comprises a floor mounted bed, conveying apparatuses embodying the invention can be provided in other configurations, such as ceiling mounted bed systems and wall mounted bed systems for example.

The conveying apparatus 20 depicted in FIG. 1 includes a base member 22, bed 24, plural supports 26 (only one support configuration 26 is labeled as such in FIG. 1), and a drive member or device 28. Base member 22 comprises an excited frame 38 and a plurality of legs 39 coupled with excited frame 38 in the depicted embodiment. Legs 39 are shown mounted to a floor or other suitable base in the illustrated arrangement.

Excited frame 38 comprises substantially parallel rails 40 coupled with legs 39. Another complementary back-side rail is utilized to provide support for bed 24 although only one front-side rail 40 is illustrated in FIG. 1. Resilient spacers 37 can be provided intermediate respective legs 39 and rails 40 of excited frame 38. Spacers 37 tend to isolate legs 39 and the floor from vibratory motions of drive member 28 translated to excited member 38. Exemplary spacers 37 comprise springs or elastomeric materials, such as bushings.

The depicted bed 24 includes a receiving end 30 and an outlet end 31. Bed 24 is configured to receive material, such as particulate material, adjacent receiving end 30. Bed 24 is further arranged to move or convey the received material towards outlet end 31. In particular, bed 24 is configured to convey material 32 from first end 30 to second end 31 in the described operation of system 20.

The depicted bed 24 includes plural support rails 27. Although only a front-side rail is shown in FIG. 1, a back-side rail is also provided as shown in further detail in U.S. Pat. No. 4,313,535 incorporated by reference above.

Drive device 28 is borne by excited frame 38 of base member 22. A subframe 48 is provided to support driver device 28 in an angled relation relative to bed 24. Drive device 28 is configured to impart movement to bed 24. In one embodiment, drive device 28 can be energized to provide vibratory movement or motion to elongated bed 24 along a line of force 45. Responsive to vibratory movement supplied from drive member 28, elongated bed 24 is configured to convey particulate material in an intended direction from receiving end 30 to outlet end 31.

Plural resilient supports 26, such as springs, are illustrated coupled intermediate bed 24 and excited frame 38. Resilient supports 26 individually include opposing ends 41, 42. Resilient supports 26 are connected at first ends 41 thereof with support rails 27 of bed 24. Opposing ends 42 of resilient supports 26 are connected with rails 40 of excited frame 38.

Drive device 28 is preferably supported by excited frame 38 in a configuration such that line of force 45 passes through a center of mass 46 of excited frame 38 including drive device 28 and a center of mass 47 of elongated bed 24. Alignment of line of force 45 through center of masses 46, 47 of excited frame 38 and bed 24 is preferred to minimize the rocking of bed 24 with respect to excited frame 38 as described in U.S. Pat. No. 4,313,535.

In addition, it is preferred to align drive device 28 to provide the line of force 45 to pass through the center of mass of conveying apparatus 20 (the center of mass of apparatus 20 is not illustrated). Further, resilient supports 26 are preferably positioned perpendicular to line of force 45. Such enables conveying apparatus 20 to operate over a rather large range of loads without experiencing excessive vibration of excited frame 38. Further, minimal horizontal and vertical forces are applied to legs 39 with the use of spacers 37 as shown in the depicted configuration of conveying system 20.

Elongated bed 24 is oriented in a spaced relation relative to excited frame 38. Plural resilient supports 26 previously mentioned couple with bed 24 at first ends 41 and with excited frame 38 of base member 22 at opposing ends 42. Resilient supports 26 are configured to support elongated bed 24 and enable elongated bed 24 to reciprocate in the intended direction to pass particulate material 32 from first end 30 to second end 31.

Figure 2:
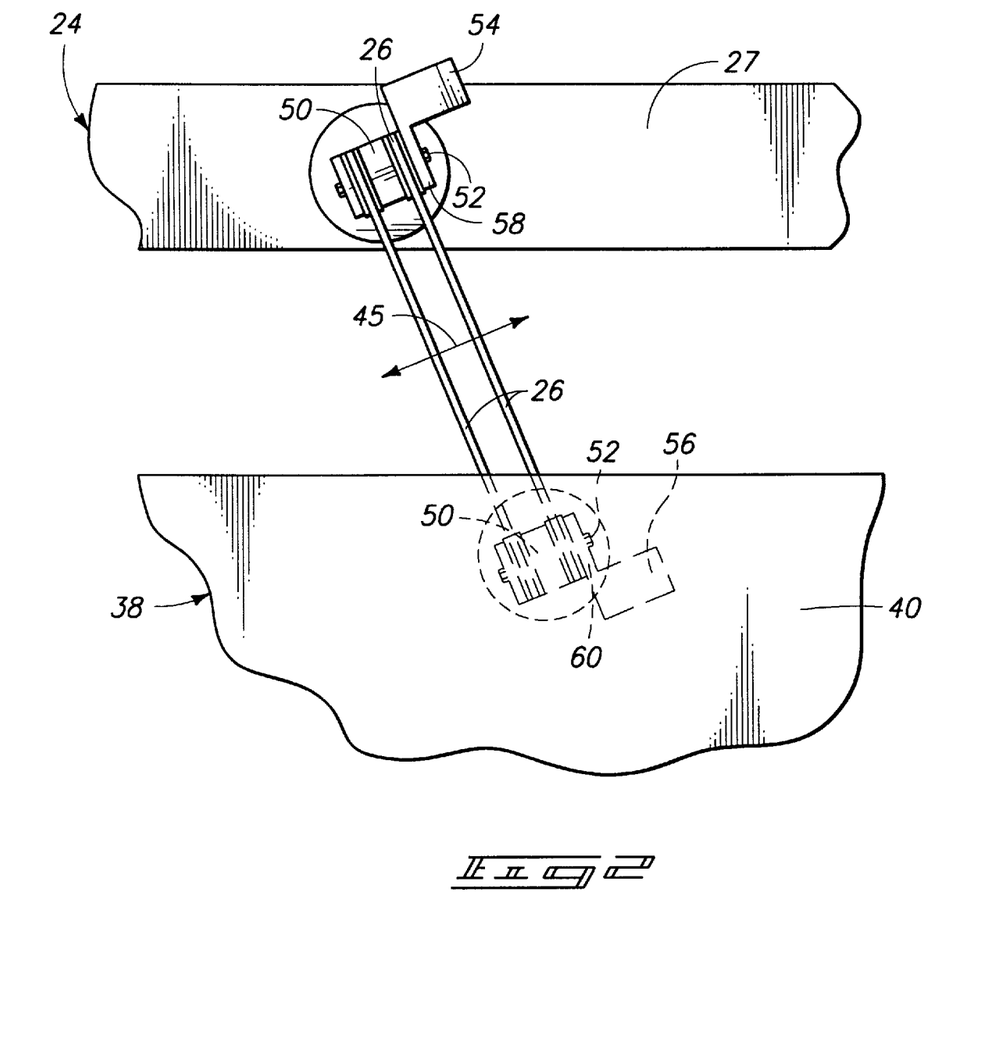
FIG. 2 is a side elevational view of an exemplary resilient support configuration of the conveying apparatus.

Referring to FIG. 2, plural resilient supports 26 are shown in detail intermediate rail 27 of bed 24 and rail 40 of frame 38. Frame members 50 are mounted upon an outer surface of rail 27 and an inner surface of rail 40. Other configurations are possible. Frame members 50 are arranged to receive parallel plural supports 26 in the depicted configuration. The depicted frame members 50 comprise brackets although other arrangements are possible.

Plural resilient supports 26 are coupled with frame members 50 using one or more bolts 52 extending through individual resilient supports 26 and frame members 50. As shown in FIG. 2, plural sensor circuit configurations 54, 56 are coupled with bed 24 and frame 38, respectively. Individual sensor circuits 54, 56 include respective flanges 58, 60. Bolts 52 pass through respective flanges 58, 60 to secure sensor circuits 54, 56 to corresponding frame members 50. Sensor circuits 54, 56 are positioned to monitor acceleration in a direction perpendicular to the elongated direction of resilient supports 26 as represented by arrow of force 45 as described further below. Accordingly, bed sensor 54 is operable to provide acceleration information regarding the movement of bed 24 and frame sensor 56 is operable to provide acceleration information of frame 38. Sensor circuits 54, 56 are coupled with a control assembly 62 coupled with one of legs 39 as shown in FIG. 1. Alternatively, control assembly 62 is positioned in another location, such as coupled with frame 38.

Figure 3:
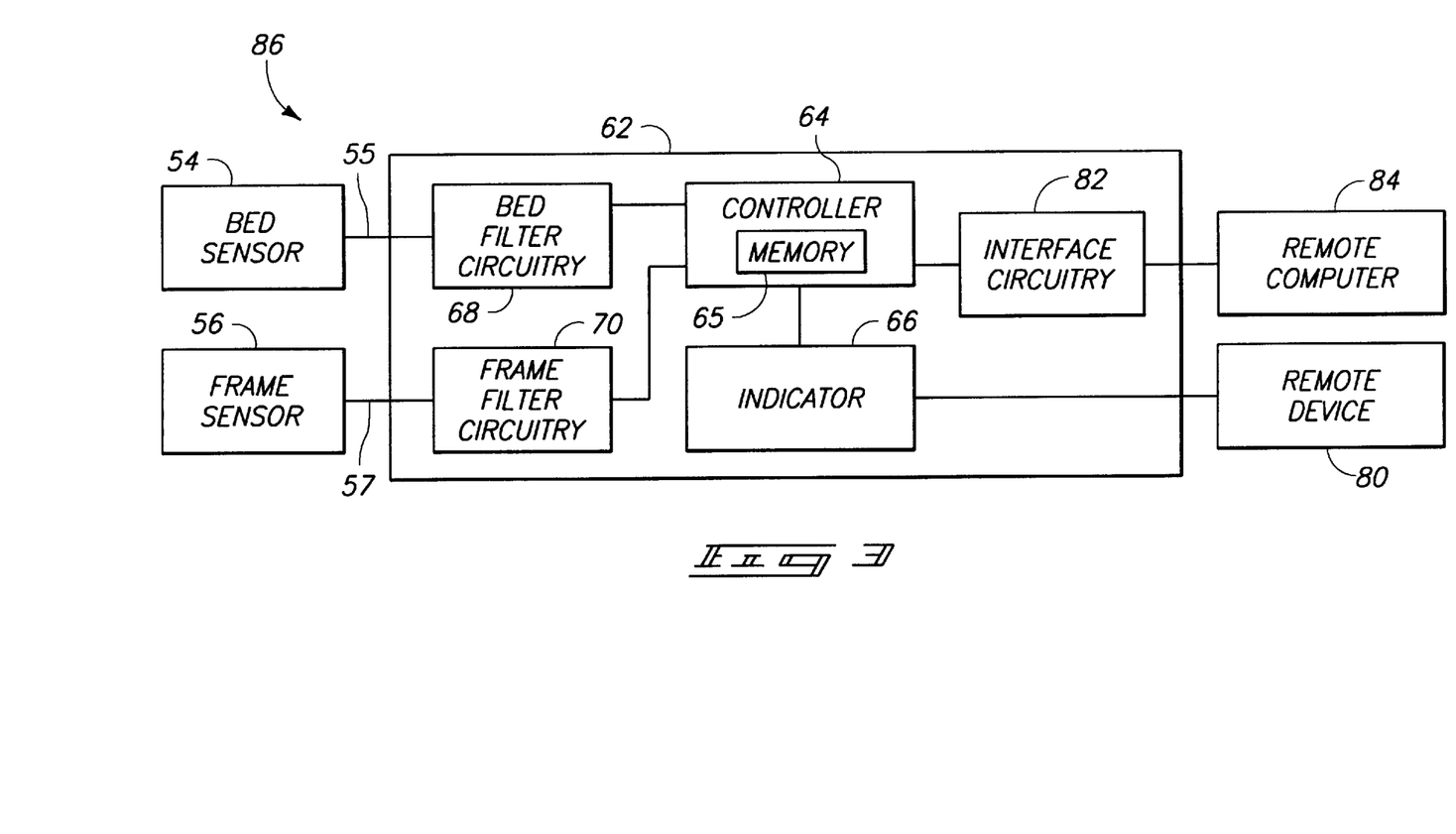
FIG. 3 is a functional block diagram illustrating exemplary components of the conveying apparatus.

Referring to FIG. 3, one configuration of control assembly 62 is shown coupled with external components. The depicted control assembly 62 includes a controller 64, indicator 66, bed filter circuitry 68 and frame filter circuitry 70. Bed sensor 54 is coupled with bed filter circuitry 68 using a connection 55. Frame sensor 56 is coupled with frame filter circuitry 70 using a connection 57. Connections 55, 57 can comprise shielded cable in a preferred embodiment to minimize the introduction of noise into signals outputted from respective sensors 54, 56. Controller 64 is coupled with an external remote device 80 and interface circuitry 82 which is coupled with a remote computer 84 in the depicted arrangement.

In one configuration, bed sensor 54 and frame sensor 56 and control assembly 62 provide an indication assembly 86. Indication assembly 86 is configured to indicate operation of conveying apparatus 20 in an operational state. Exemplary operational states or status include "below design point", "acceptable", "caution" and "emergency" as described below. As previously mentioned, drive device 28 is operable to impart movement to bed 24 and frame 38. Indication assembly 86 is configured in the described arrangement to monitor the movement of bed 24 and the movement of frame 38. Indication assembly 86 is configured to indicate such operation of conveying apparatus 20 responsive to the monitoring in one embodiment.

Although the movement of bed 24 typically has a considerably larger amplitude than the movement of frame 38, such movement of frame 38 may be monitored using frame sensor 56. As described below, indication assembly 86 is configured to calculate a phase angle relationship of the movement of bed 24 and the movement of frame 38 and to indicate the operation of conveying apparatus 20 responsive to the phase angle relationship being within a predefined range.

Bed sensor 54 is configured to monitor the movement of bed 24 (e.g., acceleration of bed 24 in the described configuration) and to output a signal indicative of movement of bed 24. Frame sensor 56 is configured to monitor the movement of frame 38 (e.g., acceleration of frame 38 in the described configuration) and output a signal indicative of movement of frame 38.

Bed sensor 24 and frame sensor 38 are coupled with controller 64 within control assembly 62 via bed filter circuitry 68 and frame filter circuitry 70, respectively. Controller 64 is configured to sample a filtered signal of bed sensor 54 and a filtered signal of frame sensor 56 to generate respective waveforms. As described further below, controller 64 is configured to determine a phase angle relationship from the respective waveforms. Thereafter, controller 64 can indicate operation of conveying apparatus 20 following the monitoring of the respective waveforms using indicator 66.

Indicator 66 of control assembly 62 indicates operation of conveying apparatus 20 in one of a plurality of states. Controller 64 controls indicator 66 to indicate operation. The below indicated phase angle relationships are exemplary and other ranges may be utilized to indicate operational states.

For example, indicator 66 can indicate operation of conveying apparatus 20 in a "below design point" state. Such corresponds to the phase angle relationship of the movement of bed 24 and the movement of frame 38 being within an approximate range of 0° to 50° in the described embodiment.

Further, indicator 66 can indicate operation of conveying apparatus 20 in an "acceptable" state. Such corresponds to the phase angle relationship of the movement of bed 24 and the movement of frame 38 being within an approximate range of 50° to 130° in accordance with one embodiment of the present invention.

Indicator 66 can further indicate operation of conveying apparatus 20 in a "caution" state when the phase angle relationship is within an approximate range of 130° to 145°. Additionally, indicator 66 can indicate operation of conveying apparatus 20 in an "emergency" state when the phase angle relationship is above approximately 145°.

Indicator 66 of indication assembly 86 may be configured to emit a human perceptible signal to indicate such operation. In one configuration, indicator 66 comprises a plurality of light emitting diodes (LEDs) to indicate operation. Such light emitting diodes (not shown) may be provided in a sequence to visually indicate operation in one of the operational states.

For example, one LED may light during operation in the "below design point" state, two LEDs may light during operation in the "acceptable" state, three LEDs may light during operation in the "caution" state and four LEDs may light during operation in the "emergency" state.

Alarms may be also issued locally at conveying apparatus 20 and/or at remote device 80 described below for one or more of the operational states. For example, an alarm may be issued during operation of conveying apparatus 20 in the "caution" state or "emergency" state. An exemplary alarm is visually and audibly perceptible. Other alarm configurations are possible.

In one configuration, indicator 66 is also operable to indicate operation of bed sensor 54 and frame sensor 56. Indicator 66 can indicate bed sensor 54 measuring a value other than zero to indicate proper operation of bed sensor 54. Indicator 66 can further indicate frame sensor 56 measuring a value other than zero to indicate proper operation of frame sensor 56. Such indication of sensor operations can be implemented using light emitting diodes.

In the described configuration, indicator 66 additionally includes a plurality of relays (not shown) corresponding to the light emitting diodes. Responsive to control from controller 64, relays of indicator 66 can selectively open and close corresponding to illumination of light using the respective light emitting diodes.

Timing circuitry may be provided within indicator 66 in some configurations to delay operation of relays for a predetermined period of time. Such minimizes forwarding of false indications to remote device 80 in the presence of spurious spikes, etc. For example, following the illumination of a light emitting diode for the specified period of time, the corresponding relay can change state to provide indication to remote device 80. Other configurations to indicate operation are possible for indicator 66.

The depicted indication assembly 86 further includes a remote device 80, such as a remote indicator, coupled with indicator 66. Remote device 80 may be provided or located in a position remote from conveying apparatus 20. For example, remote device 80 could comprise a central control location for an installation or factory having plural conveying apparatuses 20. Relays of controller 64 may convey status information of the operation of the associated conveying apparatus 20 to remote device 80 to indicate such operation at the remote location. Thus, an operator at remote device 80 can advantageously monitor status of plural conveying apparatuses 20 configured in accordance with one described aspect of the present invention.

Interface circuitry 82 couples remote computer 84 with controller 64 of control assembly 62. Remote computer 84 can be utilized to update code within controller 64 by passing such code through interface circuitry 82 to controller 64. Controller 64 may be implemented as a 68HC912B32 microcontroller having internal memory 65 and available from Motorola, Inc. Memory 65 can include random-access memory, read-only memory and/or flash memory in an exemplary configuration. Other configurations are possible. In one arrangement, remote device 80 and interface circuitry 82 are coupled with pins 22–25 and 61–63 of controller 64. Indicator 66 is coupled with pins 26–29 and 35, 36 of controller 64.

Figure 4:
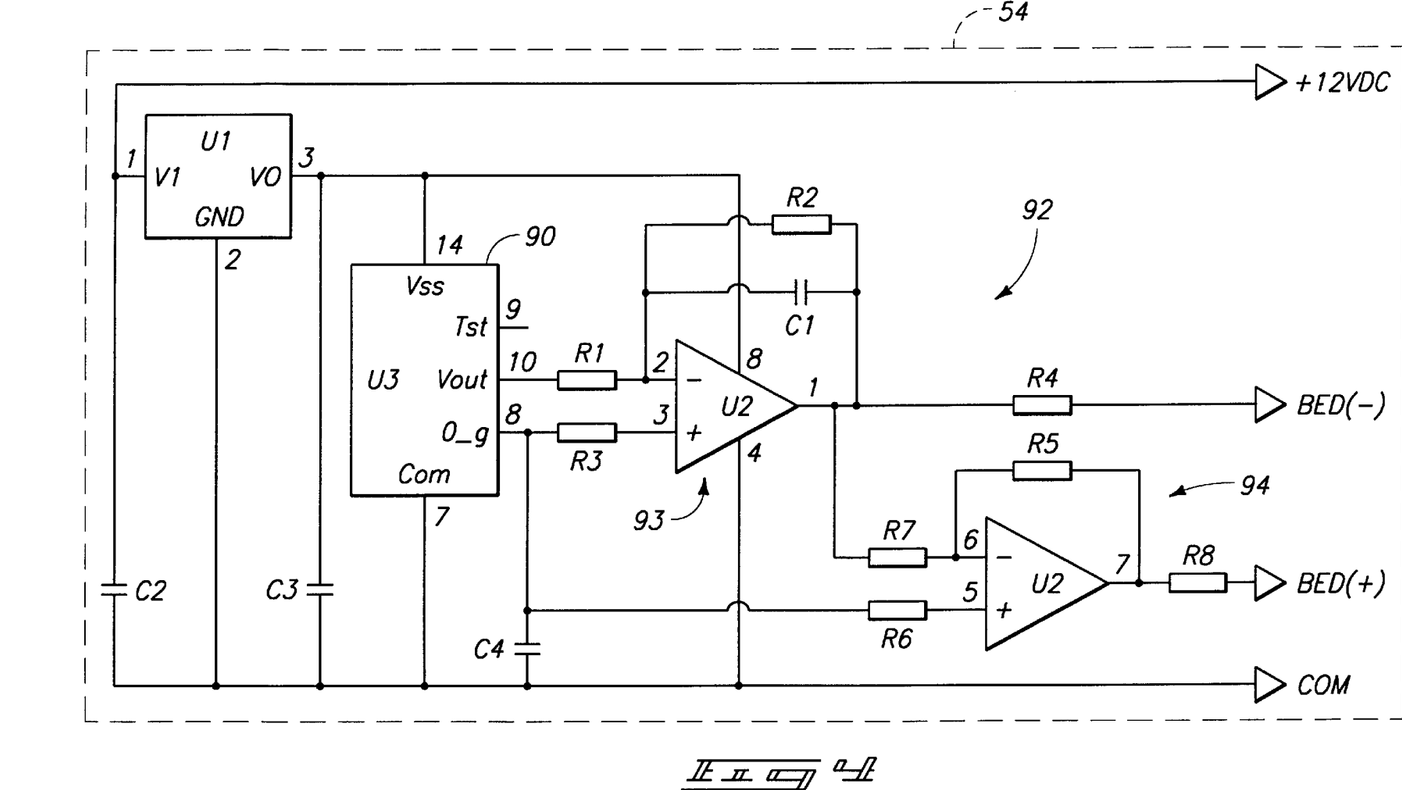
FIG. 4 is a schematic diagram illustrating one configuration of a bed sensor shown in FIG. 3.

Referring to FIG. 4, an exemplary configuration of bed sensor 54 is shown. The depicted configuration of bed sensor 54 includes an accelerometer 90 and a differential driver circuit 92. A suitable accelerometer 90 has designation ADXL150 available from Analog Devices, Inc. Differential driver circuit 92 includes plural operational amplifiers 93, 94. Operational amplifiers 93, 94 can be configured to provide a desired sensitivity for accelerometer 90 to accommodate a range of g forces during operation of a typical conveying apparatus 20.

More specifically, components utilized within bed sensor 54 may be chosen to adjust the sensitivity of accelerometer 90. Exemplary values for components of first sensor 54 are shown below in Table 1. Utilization of such components provides accelerometer 90 with a sensitivity range of approximately 0 g to 25 g.

TABLE 1

| Resistors | Value (Ω) |
|---|---|
| R1, R7 | 100 k |
| R2 | 261 k |
| R3 | 73 k |
| R4, R8, R11, R15 | 150 |
| R5 | 93 k |
| R6, R9 | 47.5 k |
| R10 | 53 k |
| R12, R14 | 2 k |
| R13 | 500 |
| R16 | 118 k |
| R17, R18 | 1 k |
| Capacitors | Value (F) |
| C1 | 0.022 u |
| C2, C6 | 10 u |
| C3, C4, C5, C7, C8 | 0.1 u |
| C9 | 0.1 u |
| Integrated Circuits | Designation |
| U1, U4 | 78L05 |
| U2, U6 | MAX4132 |
| U3 | ADXL150 |
| U5 | ADXL202 |

Bed sensor 54 is mounted to bed bracket or frame member 50 provided upon conveyor 24. Bed sensor 54 monitors the movement of conveyor 24 and outputs a signal indicative of such movement to operational amplifier 93. Operational amplifier 93 outputs an inverted signal corresponding to the movement of conveyor 24 as represented by a BED(−) signal which is applied to bed filter circuitry 68 of control assembly 62.

Operational amplifier 94 inverts the inverted signal outputted from inverter 93 and provides a BED(+) signal. The BED(+) signal is also applied to bed filter circuitry 68. Bed sensor 54 preferably outputs both differential signals (i.e., the BED(−) signal and BED(+) signal) to enable circuitry within control assembly 62 to extract any interference (e.g., 60 Hz noise) induced from communication using connection 55 as described below. Connection 55 preferably comprises shielded cable to reduce the inducement of noise.

Figure 5:
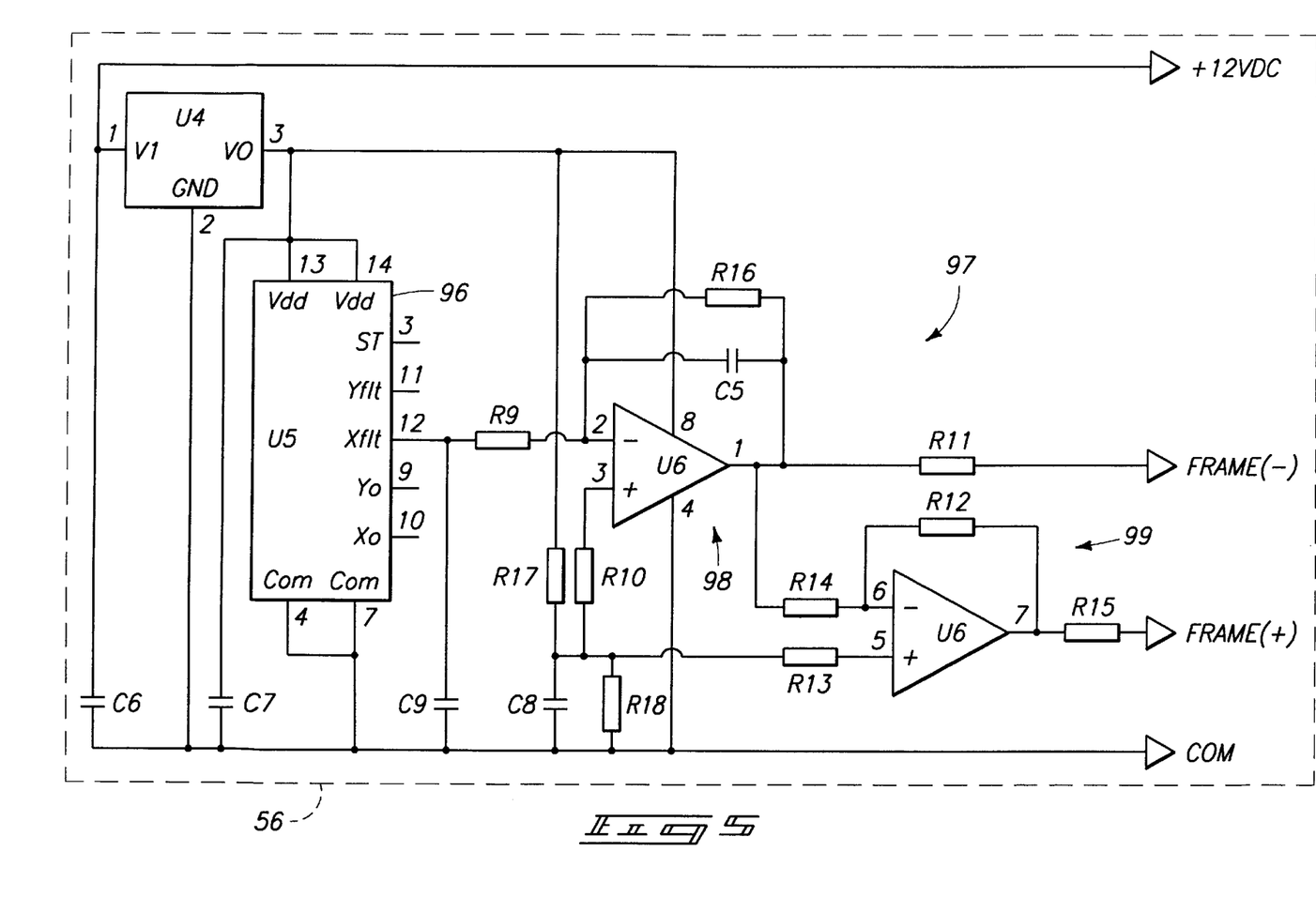
FIG. 5 is a schematic diagram illustrating one configuration of a frame sensor shown in FIG. 3.

Referring to FIG. 5, an exemplary configuration of frame sensor 56 is shown. The depicted configuration of frame sensor 56 includes an accelerometer 96 and a differential driver circuit 97. A suitable accelerometer 96 has designation ADXL202, available from Analog Devices, Inc. Differential driver circuit 97 includes plural operational amplifiers 98, 99. Operational amplifiers 98, 99 can be configured to provide a desired sensitivity for accelerometer 96 to accommodate a range of g forces expected to be experienced by frame 38 during operation of a typical conveying apparatus 20.

More specifically, the components utilized within frame sensor 56 may be chosen to adjust the sensitivity of accelerometer 96. Exemplary values for components of frame sensor 56 are shown above in Table 1. Utilization of such components provides accelerometer 96 with a sensitivity range of approximately 0 g to 2 g.

Frame sensor 56 is mounted to frame member 50 provided upon frame 38. Frame sensor 56 monitors the movement of frame 38 and outputs a signal indicative of such movement to operational amplifier 98. Inverter 98 outputs an inverted signal corresponding to the movement of frame 38 as represented by a FRAME(−) signal which is applied to frame filter circuitry 70 of control assembly 62.

Operational amplifier 99 inverts the inverted signal outputted from operational amplifier 98 and provides a FRAME (+) signal. The FRAME(+) signal is also applied to frame filter circuitry 70. Frame sensor 56 preferably outputs both differential signals (i.e., the FRAME(−) signal and FRAME (+) signal) to enable circuitry within control assembly 62 to extract any interference induced from communication using connection 57 as described below. Connection 57 also preferably comprises shielded cable to reduce the inducement of noise.

Figure 6:
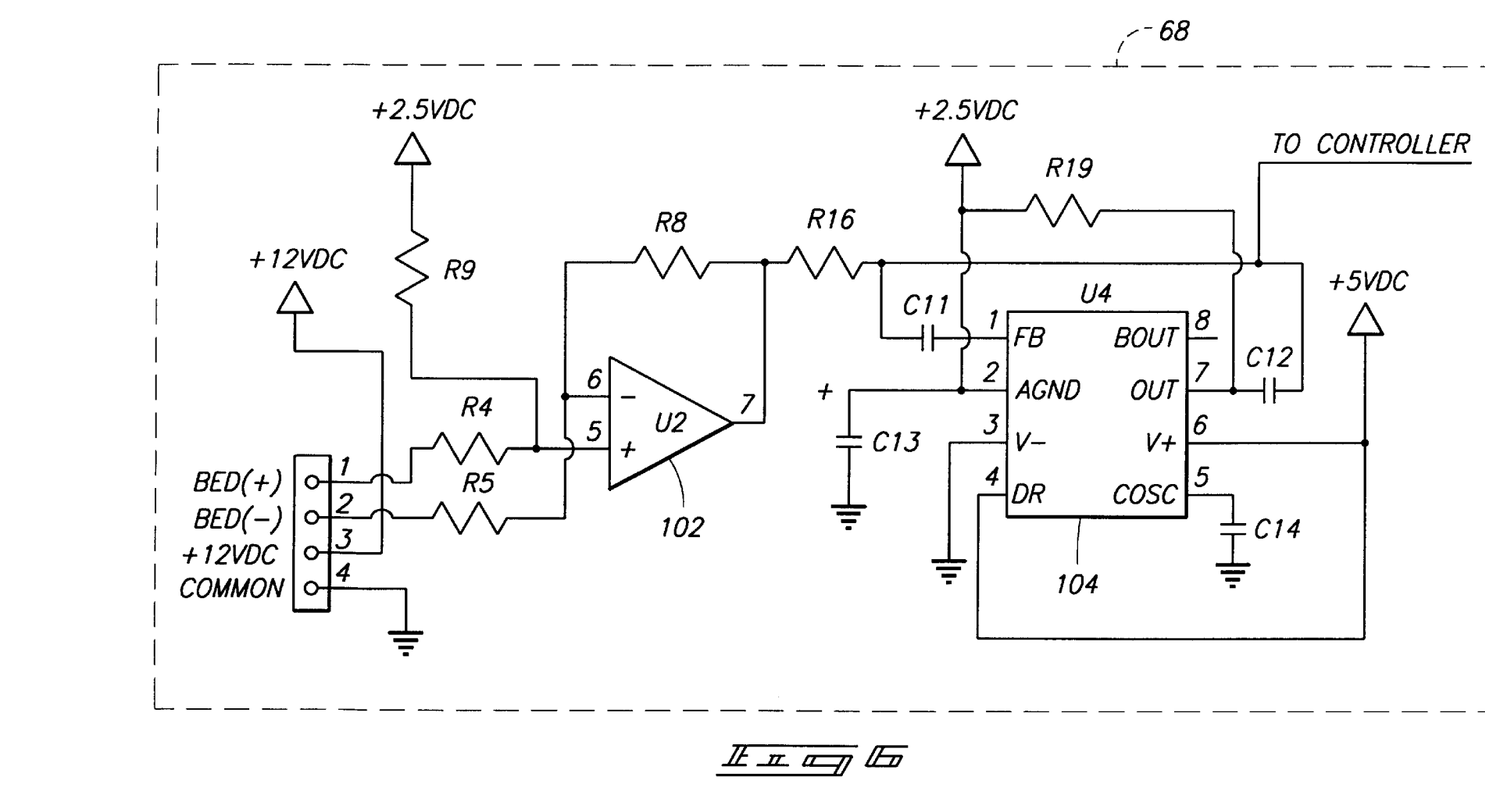
FIG. 6 is a schematic diagram illustrating one configuration of bed filter circuitry shown in FIG. 3.

Referring to FIG. 6, one configuration of bed filter circuitry 68 is shown. The BED(+) and BED(−) signals are applied to difference amplifier 102. Difference amplifier 102 operates to remove any noise induced within the received BED(+) and BED(−) signals from bed sensor 54. Operational amplifier 102 subtracts the BED(+) and BED(−) signals to extract the original signal outputted from accelerometer 90 without induced noise.

Thereafter, the signal is applied to a low pass filter 104. In the described embodiment, low pass filter 104 comprises a fifth order low pass filter. Low pass filter 104 operates to suppress frequencies above 25 Hz. An exemplary low pass filter 104 provides approximately 36 dB attenuation at 60 Hz. The filtered signal received from bed sensor 54 is thereafter applied to a pin 51 of controller 64 for processing. Exemplary values of components of bed filter circuitry 68 are shown below in Table 2.

TABLE 2

| Resistors | Value (Ω) |
|---|---|
| R4, R5 | 10 k |
| R8, R9 | 5.2 k |
| R10–R11, R13, R14 | 2.2 k |
| R12, R16 | 38 k |
| R15, R19 | 250 k |
| Capacitors | Value (F) |
| C8, C11 | 0.47 u |
| C7, C10, C12 | 0.1 u |
| C9, C13 | 47 u |
| C14, C15 | 0.002 u |
| Integrated Circuits | Designation |
| U2 | MAX4132 |
| U3, U4 | LTC1062 |

Figure 7:
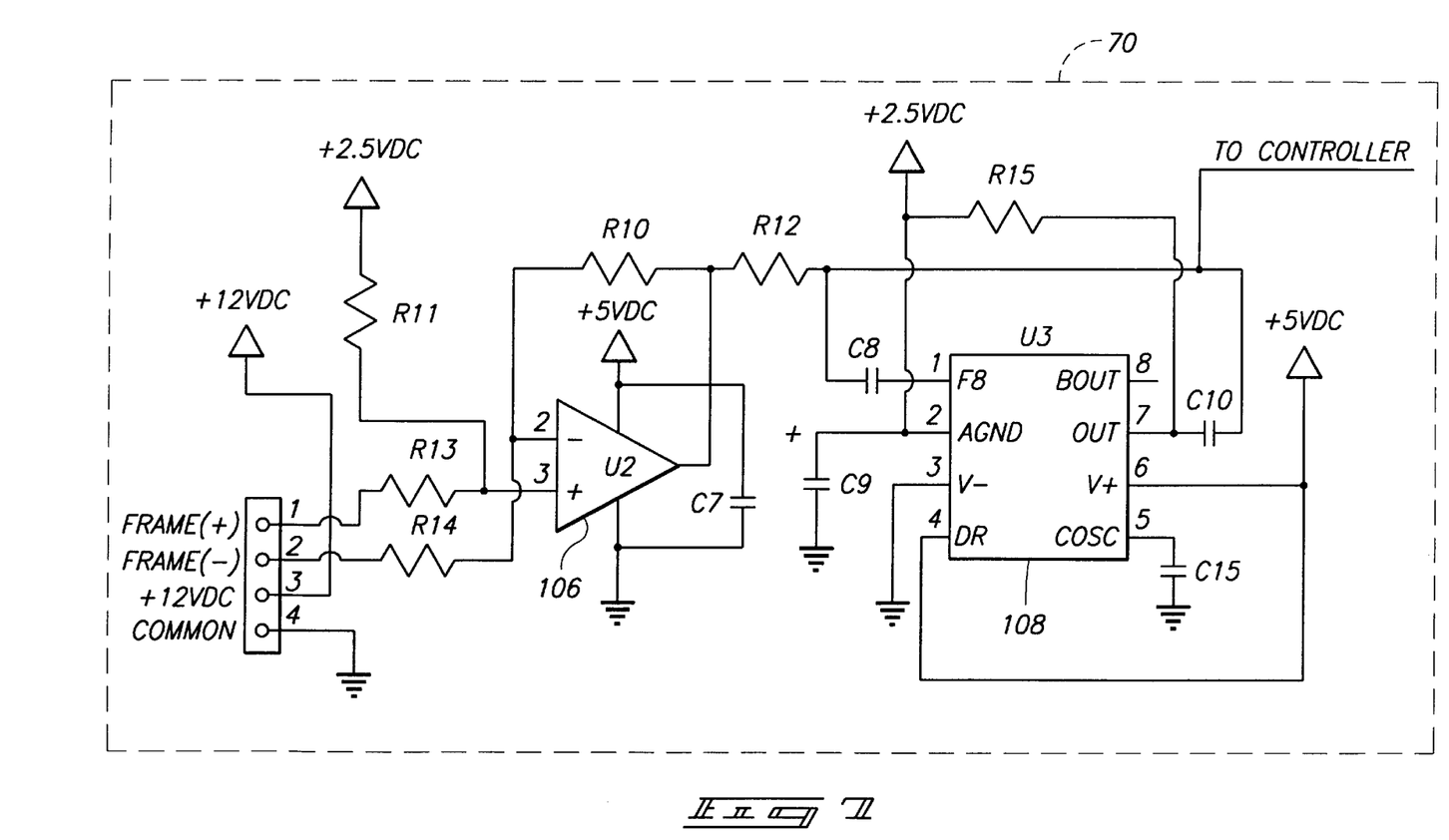
FIG. 7 is a schematic diagram illustrating one configuration of frame filter circuitry shown in FIG. 3.

Referring to FIG. 7, one configuration of frame filter circuitry 70 is shown. The FRAME(+) and FRAME(−) signals are applied to difference amplifier 106. Difference amplifier 106 operates to remove any noise induced within the received FRAME(+) and FRAME(−) signals from frame sensor 56. Operational amplifier 106 subtracts the FRAME (+) and FRAME(−) signals to extract the original signal outputted from accelerometer 96 without induced noise.

Thereafter, the signal is applied to a low pass filter 108. In the described embodiment, low pass filter 108 comprises a fifth order low pass filter. Low pass filter 108 operates to suppress frequencies above 25 Hz. An exemplary low pass filter 108 provides approximately 36 dB attenuation at 60 Hz. The filtered signal received from frame sensor 56 is thereafter applied to a pin 52 of controller 64 for processing. Exemplary values of components of frame filter circuitry 70 are shown above in Table 2.

Figure 8:
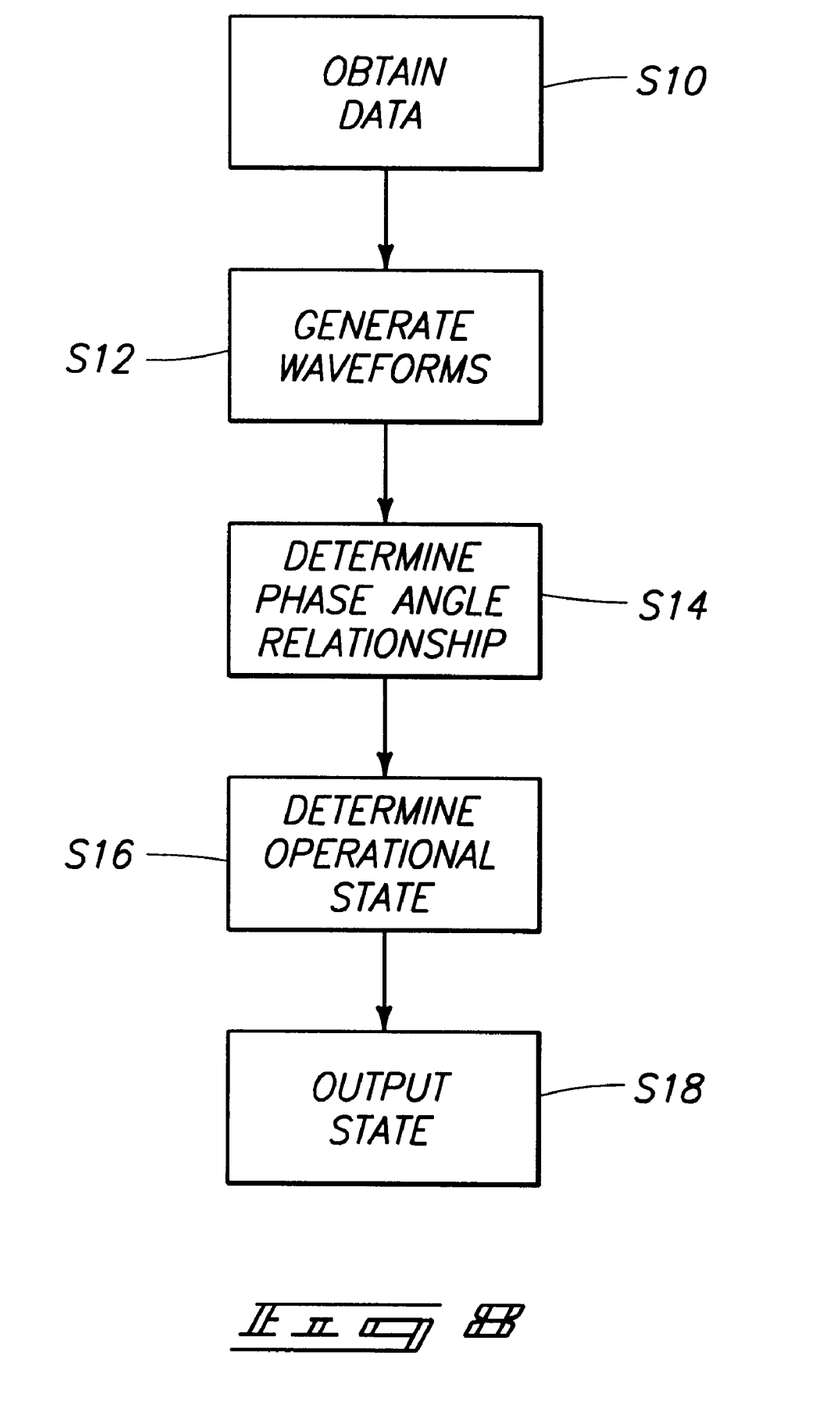
FIG. 8 is a flow chart illustrating exemplary operations of a controller of the conveying apparatus.

Referring to FIG. 8, exemplary monitoring and indicating operations of conveying apparatus 20 are described. In a preferred embodiment, controller 64 implements the method described in FIG. 8. Executable code corresponding to the depicted flow chart may be stored within the internal flash memory of controller 64. In an alternative embodiment, control assembly 62 can include hardware to implement the described methodology.

Initially, at step S10, controller 64 obtains data from bed sensor 54 and frame sensor 56. Controller 64 includes an 8 bit analog-to-digital converter to provide digital representations of the received BED signal and FRAME signal. In one configuration, controller 64 retrieves eight data points from individual ones of bed sensor 54 and frame sensor 56 every millisecond. Further, controller 64 averages the retrieved data points and stores the averaged results in an array.

Figure 10:
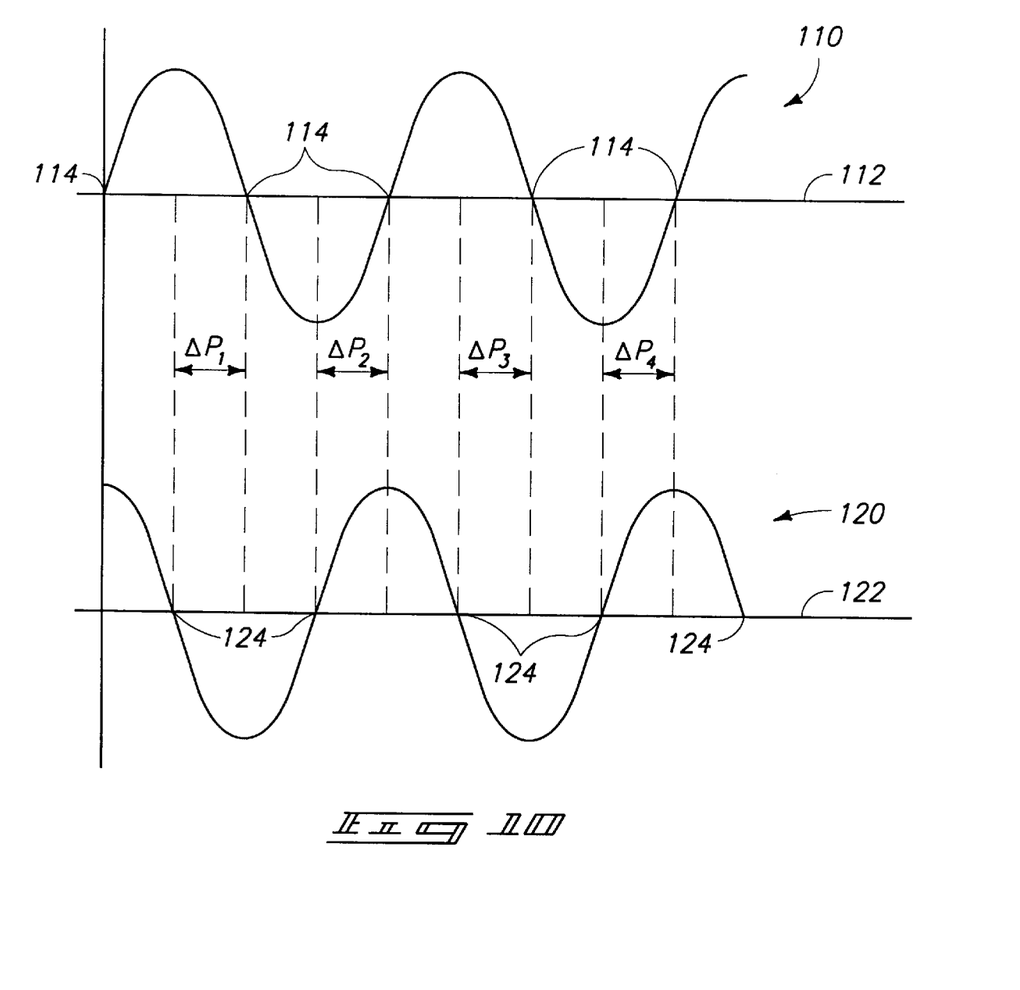
FIG. 10 is a graphical illustration of an exemplary waveform of bed movement and an exemplary waveform of frame movement during operation of the conveying apparatus.

At step S12, controller 64 generates two waveforms (exemplary waveforms 110, 120 are shown in FIG. 10) from the data points stored in the respective arrays corresponding to data from bed sensor 54 and frame sensor 56. In the described embodiment, the plural waveforms are analyzed after 200 sample sequences are stored in the array in accordance with the above procedure.

Next, controller 64 determines a phase angle relationship of waveform 110 corresponding to data from bed sensor 54 with waveform 120 generated from data of frame sensor 56 at step S14. Following the phase angle relationship determination, controller 64 can determine the operational state of conveying apparatus 20 at step S16. For example, if the phase angle relationship is within an approximate range of 0° to 50°, a "below design point" state may be indicated. If the phase angle relationship is within an approximate range of of 50° to 130°, an "acceptable" state may be indicated. If the phase angle relationship is within an approximate range of 130° to 145°, a "caution" state may be indicated. For phase angle relationships above approximately 145°, an "emergency" state may be indicated.

Accordingly, the appropriate state or status as determined in step S16 is outputted from controller 64 at step S18. Such state can be applied to indicator 66 for indication of the status at the location of conveying apparatus 20 and/or the status can be outputted to remote device 80 for remote monitoring applications.

Figure 9:
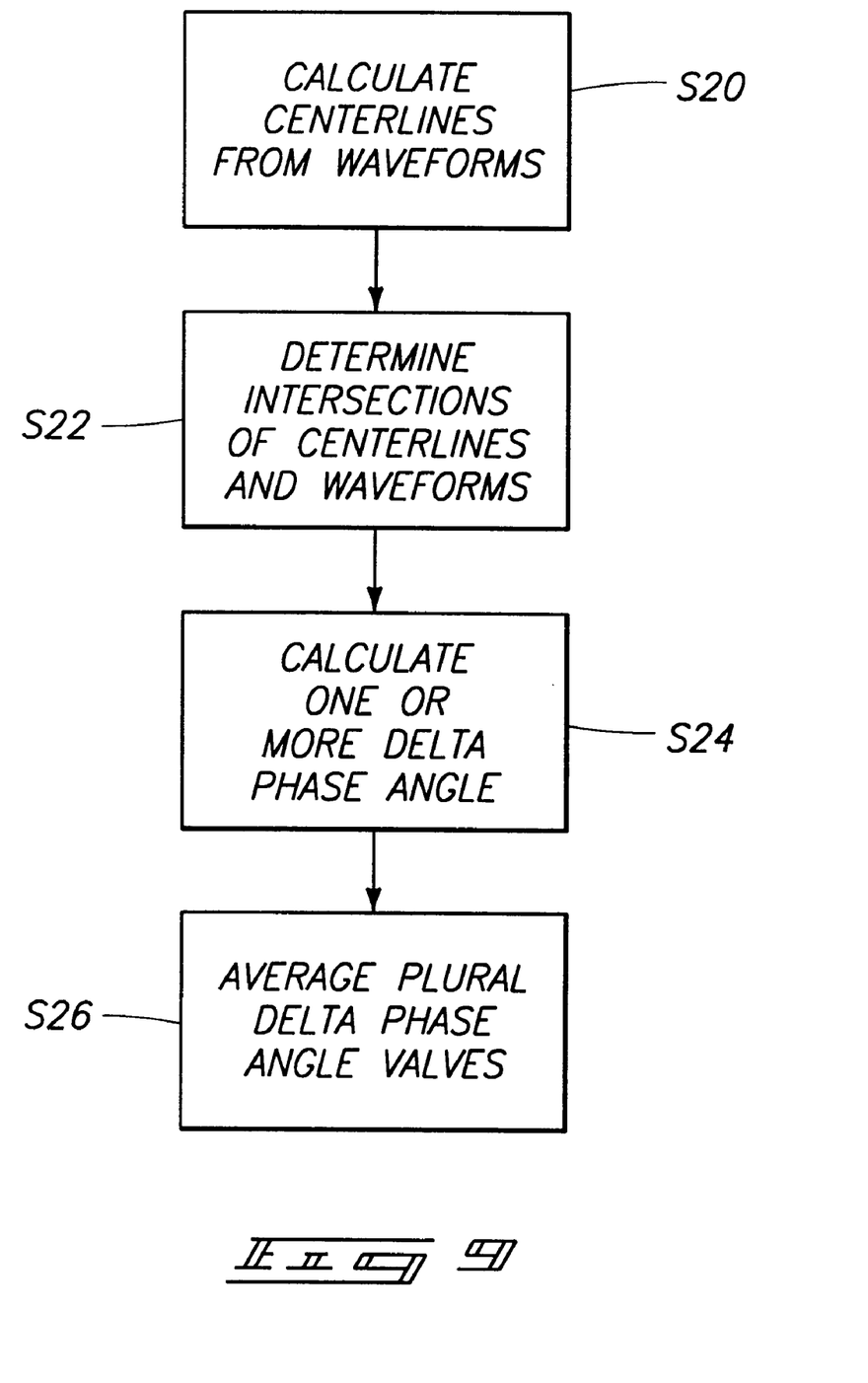
FIG. 9 is a flow chart illustrating one methodology of determining a phase angle relationship during operations of the conveying apparatus.

Referring to FIG. 9, further details of one exemplary method for determining the phase angle relationship of step S14 in FIG. 8 is described. Initially, plural centerlines 112, 122 are calculated at step S20 for respective waveforms 110, 120 by controller 64. Controller 64 can determine centerline voltages from maximum and minimum voltages of respective waveforms 110, 120 derived from the BED and FRAME signals received from bed sensor 54 and frame sensor 56, respectively.

At step S22, controller 64 determines intersections 114, 124 of the centerlines 112, 122 with the respective waveforms 110, 120. Such can be determined when the voltages of the waveforms 110, 120 are equal to the voltages of the respective centerlines 112, 122. Thereafter, controller 64 can calculate one or more delta phase angles (depending on the frequency of the waveforms) from the intersection determination of step S24. Four delta phase angles $\Delta P_1 – \Delta P_4$ are shown calculated in FIG. 10.

At step S26, controller 64 averages the delta phase angle values if more than one delta phase angle is calculated. The one delta phase angle value or averaged phase angle value represents the phase angle relationship of the movement of conveyor 24 and the movement of frame 38. Thereafter, controller 64 indicates an operational state of conveying apparatus 20 utilizing indicator 66 and/or remote device 80 following the determination of the phase angle relationship.

Controller 64 preferably includes memory 65, such as random-access memory and/or EEPROM memory. Memory 65 can be utilized to store the phase angle relationships determined during operation of conveying apparatus 20. Such information can be periodically displayed or downloaded from memory 65 into remote computer 84 or other device for analysis. Such provides information regarding operational states of conveying apparatus 20 over a period of time. For example, a number of alarm conditions for the period of time can be observed and utilized to recommend future operations of conveying apparatus 20.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A conveying apparatus comprising:
   a frame;
   a bed coupled with the frame and configured to convey material;
   a drive device configured to impart movement to the bed; and
   circuitry configured to monitor movement of the bed and to monitor movement of the frame to determine an operational state of the conveying apparatus.

2. The conveying apparatus according to claim 1 wherein the circuitry is configured to monitor movement of the bed with respect to movement of the frame.

3. The conveying apparatus according to claim 1 further comprising an indicator configured to indicate an operational state of the conveying apparatus, and wherein the circuitry is configured to control the indicator responsive to the monitoring of the movement of the bed and the monitoring of the movement of the frame.

4. The conveying apparatus according to claim 1 wherein the circuitry is configured to determine a phase angle relationship of the movement of the frame and the movement of the bed to monitor the movement of the bed and the movement of the frame and to control an indicator to indicate operation of the conveying apparatus responsive to the phase angle relationship.

5. The conveying apparatus according to claim 1 wherein the circuitry is configured to determine a phase angle relationship of the movement of the frame and the movement of the bed to monitor the movement of the bed and the movement of the frame.

6. The conveying apparatus according to claim 5 further comprising:
   a bed sensor configured to output a signal indicative of movement of the bed; and
   a frame sensor configured to output a signal indicative of movement of the frame, and wherein the circuitry is configured to sample the signal of the bed sensor and the signal of the frame sensor to generate respective waveforms, to calculate centerlines for the respective waveforms, and to determine at least one delta phase angle value from corresponding intersections of the waveforms with the respective centerlines to determine the phase angle relationship.

7. The conveying apparatus according to claim 6 further comprising a resilient support coupled intermediate the frame and the bed and the bed sensor and the frame sensor comprise respective accelerometers coupled with the support.

8. The conveying apparatus according to claim 7 wherein the accelerometers are positioned to measure acceleration in a substantially perpendicular direction with respect to the support.

9. The conveying apparatus according to claim 1 further comprising an indicator configured to indicate operation of the conveying apparatus, and wherein the circuitry is configured to determine a phase angle relationship of the movement of the frame and the movement of the bed, and to control the indicator to indicate operation in a below design point state when the phase angle relationship is within an approximate range of 0° to 50°, to indicate operation in an acceptable state when the phase angle relationship is within an approximate range of 50° to 130°, to indicate operation in a caution state when the phase angle relationship is within an approximate range of 130° to 145°, and to indicate operation in an emergency state when the phase angle relationship is above approximately 145°.

10. The conveying apparatus according to claim 1 wherein the circuitry is configured to issue an alarm responsive to the monitoring.

11. The conveying apparatus according to claim 1 further comprising an indicator, and wherein the circuitry is configured to control the indicator to emit a human perceptible signal to indicate an operational state of the conveying apparatus responsive to the monitoring.

12. The conveying apparatus according to claim 11 wherein the indicator is configured to indicate the operation of the conveying apparatus at a location of the conveying apparatus and to output a signal to indicate the operation of the conveying apparatus at a location remote from the conveying apparatus.

13. A conveying apparatus comprising:
    a frame;
    a bed configured to convey material in a direction;
    a drive device configured to impart movement to the bed and to the frame; and
    an indication assembly configured to determine a phase angle relationship of the movement of the frame and the movement of the bed and to indicate operation of the conveying apparatus in an operational state responsive to the phase angle relationship being within a range, wherein the indication assembly includes:
       a bed sensor configured to output a signal indicative of movement of the bed;
       a frame sensor configured to output a signal indicative of movement of the frame; and
       a controller configured to sample the signal of the bed sensor and the signal of the frame sensor to generate respective waveforms, to calculate centerlines for the respective waveforms, and to determine at least one delta phase angle value from corresponding intersections of the waveforms with the respective centerlines to determine the phase angle relationship.

14. The conveying apparatus according to claim 13 further comprising a resilient support coupled intermediate the frame and the bed and the bed sensor and the frame sensor comprise respective accelerometers coupled with the support.

15. The conveying apparatus according to claim 14 wherein the accelerometers are positioned to measure acceleration in a substantially perpendicular direction with respect to the support.

16. A conveying apparatus comprising:
    a frame;
    a bed configured to convey material in a direction;
    a drive device configured to impart movement to the bed and the frame; and
    an indication assembly configured to determine a phase angle relationship of the movement of the bed and the movement of the frame and to indicate operation of the conveying apparatus in an operational state responsive to the phase angle relationship being within a range.

17. The conveying apparatus according to claim 16 wherein the indication assembly is configured to issue an alarm responsive to operation within the operational state.

18. The conveying apparatus according to claim 16 wherein the indication assembly is configured to emit a human perceptible signal to indicate operation.

19. The conveying apparatus according to claim 16 wherein the indication assembly is configured to indicate operation at a location of the conveying apparatus and at a location remote from the conveying apparatus.

20. The conveying apparatus according to claim 16 wherein the indication assembly includes memory configured to store the operational state.

21. An indication assembly configured to indicate operation of a conveying apparatus, the indication assembly comprising:
   a bed sensor coupled with the bed to monitor movement of the bed and output a signal indicative of the movement of the bed;
   a frame sensor coupled with the frame to monitor movement of the frame and output a signal indicative of the movement of the frame;
   an indicator configured to indicate operation of the conveying apparatus in an operational state; and
   a controller configured to determine a phase angle relationship of the movement of the bed and the movement of the frame responsive to processing of the signal from the bed sensor and the signal from the frame sensor and to control the indicator to indicate operation responsive to the phase angle relationship being within a range.

22. The indication assembly according to claim 21 wherein the controller is configured to sample the signal of the bed sensor and the signal of the frame sensor to generate respective waveforms, to calculate centerlines for the respective waveforms, and to determine at least one delta phase angle value from corresponding intersections of the waveforms with the respective centerlines to determine the phase angle relationship.

23. The indication assembly according to claim 21 wherein the controller is configured to control the indicator to indicate operation in a below design point state when the phase angle relationship is within an approximate range of 0° to 50°, to indicate operation in an acceptable state when the phase angle relationship is within an approximate range of 50° to 130°, to indicate operation in a caution state when the phase angle relationship is within an approximate range of 130° to 145°, and to indicate operation in an emergency state when the phase angle relationship is above approximately 145°.

24. The indication assembly according to claim 21 wherein the indicator is configured to issue an alarm responsive to operation within the operational state.

25. The indication assembly according to claim 21 wherein the bed sensor and the frame sensor individually comprise an accelerometer.

26. The indication assembly according to claim 21 wherein the indicator is configured to emit a human perceptible signal to indicate operation.

27. The indication assembly according to claim 21 wherein the indicator is configured to indicate operation at a location of the conveying apparatus and at a location remote from the conveying apparatus.

28. The indication assembly according to claim 21 further comprising memory configured to store the operational state.

29. The indication assembly according to claim 28 wherein the memory is provided within the controller.

30. A conveying apparatus comprising:
   a frame;
   a bed configured to convey material in a direction;
   a drive device configured to impart movement to the bed;
   a control assembly configured to monitor movement of the bed and movement of the frame to determine an operational state of the conveying apparatus; and
   memory configured to store the operational state.

31. The conveying apparatus according to claim 30 wherein the drive device is operable to impart movement to the frame and the control assembly is configured to monitor the movement of the bed and the movement of the frame and to determine the operational state responsive to the monitoring.

32. The conveying apparatus according to claim 30 wherein the drive device is operable to impart movement to the frame and the control assembly is configured to determine a phase angle relationship of the movement of the frame and the movement of the bed and to determine the operational state responsive to the phase angle relationship being within a range.

33. The conveying apparatus according to claim 32 wherein the control assembly includes:
   a bed sensor configured to output a signal indicative of movement of the bed;
   a frame sensor configured to output a signal indicative of movement of the frame; and
   a controller configured to sample the signal of the bed sensor and the signal of the frame sensor to generate respective waveforms, to calculate centerlines for the respective waveforms, and to determine at least one delta phase angle value from corresponding intersections of the waveforms with the respective centerlines to determine the phase angle relationship.

34. A conveying apparatus comprising:
   a frame;
   a bed configured to convey material in a direction;
   a drive device configured to impart movement to the bed; and
   an indication assembly configured to indicate operation of the conveying apparatus in an operational state, wherein the indication circuitry includes:
     an indicator configured to indicate the operation; and
     a controller configured to determine a phase angle relationship of movement of the frame and the movement of the bed, and to control the indicator to indicate operation in a below design point state when the phase angle relationship is within an approximate range of 0° to 50°, to indicate operation in an acceptable state when the phase angle relationship is within an approximate range of 50° to 130°, to indicate operation in a caution state when the phase angle relationship is within an approximate range of 130° to 145°, and to indicate operation in an emergency state when the phase angle relationship is above approximately 145°.

35. A conveying apparatus comprising:
   a frame;
   a bed configured to convey material in a direction;
   a drive device configured to impart movement to the bed and the frame; and
   an indication assembly configured to determine a phase angle relationship of the movement of the bed and the movement of the frame and to indicate operation of the conveying apparatus in an operational state responsive to the phase angle relationship being within a range, wherein the indication assembly includes:

an indicator configured to indicate the operation;

a bed sensor configured to output a signal indicative of movement of the bed;

a frame sensor configured to output a signal indicative of movement of the frame; and a controller configured to sample the signal of the bed sensor and the signal of the frame sensor to generate respective waveforms, to calculate centerlines for the respective waveforms, and to determine at least one delta phase angle value from corresponding intersections of the waveforms with the respective centerlines to determine the phase angle relationship.

36. The conveying apparatus according to claim 35 further comprising a resilient support coupled intermediate the frame and the bed, and the bed sensor and the frame sensor comprise respective accelerometers coupled with the support.

37. The conveying apparatus according to claim 36 wherein the accelerometers are positioned to measure acceleration in a substantially perpendicular direction with respect to the support.

38. A conveying apparatus comprising:

a frame;

a bed configured to convey material in a direction;

a drive device configured to impart movement to the bed and the frame; and an indication assembly configured to determine a phase angle relationship of the movement of the bed and the movement of the frame and to indicate operation of the conveying apparatus in an operational state responsive to the phase angle relationship being within a range, wherein the indication assembly includes:

an indicator configured to indicate the operation; and a controller configured to calculate the phase angle relationship, and to control the indicator to indicate operation in a below design point state when the phase angle relationship is within an approximate range of 0° to 50°, to indicate operation in an acceptable state when the phase angle relationship is within an approximate range of 50° to 130°, to indicate operation in a caution state when the phase angle relationship is within an approximate range of 130° to 145°, and to indicate operation in an emergency state when the phase angle relationship is above approximately 145°.

39. A conveying apparatus comprising:

a frame;

a bed configured to convey material in a direction;

a drive device configured to impart movement to the bed and to the frame;

a control assembly configured to determine a phase angle relationship of the movement of the frame and the movement of the bed and to determine an operational state of the conveying apparatus responsive to the phase angle relationship being within a range, wherein the control assembly includes:

a bed sensor configured to output a signal indicative of movement of the bed;

a frame sensor configured to output a signal indicative of movement of the frame; and a controller configured to sample the signal of the bed sensor and the signal of the frame sensor to generate respective waveforms, to calculate centerlines for the respective waveforms, and to determine at least one delta phase angle value from corresponding intersections of the waveforms with the respective centerlines to determine the phase angle relationship.; and memory configured to store the operational state.

* * * * *